(12) United States Patent
Chen

(10) Patent No.: US 8,490,653 B2
(45) Date of Patent: Jul. 23, 2013

(54) CERAMIC VALVE CORE WITH COLD/HOT SEPARATION POINT SNAPPING FUNCTIONS

(75) Inventor: Mei-Li Chen, Tanzih Township, Taichung County (TW)

(73) Assignee: Kuching International Ltd., Tanzih Township, Taichung County (TW)

( * ) Notice: Subject to any disclaimer, the term of this patent is extended or adjusted under 35 U.S.C. 154(b) by 434 days.

(21) Appl. No.: 12/978,725

(22) Filed: Dec. 27, 2010

(65) Prior Publication Data
US 2012/0160354 A1  Jun. 28, 2012

(51) Int. Cl.
*F16K 11/08* (2006.01)

(52) U.S. Cl.
USPC ........................................ 137/625.4; 251/97

(58) Field of Classification Search
USPC ........................................ 137/625.4; 251/297
See application file for complete search history.

(56) References Cited

U.S. PATENT DOCUMENTS

| | | | | |
|---|---|---|---|---|
| 4,941,509 A | * | 7/1990 | Orlandi | 137/625.17 |
| 5,386,852 A | * | 2/1995 | Bosio | 137/625.17 |
| 5,522,429 A | * | 6/1996 | Bechte et al. | 137/625.17 |
| 5,538,041 A | * | 7/1996 | Ganzle | 137/625.17 |
| 5,592,971 A | * | 1/1997 | Knapp | 137/625.41 |
| 6,321,789 B1 | * | 11/2001 | Chen | 137/625.17 |
| 6,796,544 B1 | * | 9/2004 | Chen | 251/205 |
| 7,108,012 B2 | * | 9/2006 | Rosko et al. | 137/625.4 |
| 7,219,696 B2 | * | 5/2007 | Cattaneo | 137/625.4 |

* cited by examiner

*Primary Examiner* — John Fox
(74) *Attorney, Agent, or Firm* — Egbert Law Offices, PLLC

(57) ABSTRACT

An improved ceramic valve core with snapping functions for the cold/hot separation point having a valve casing, rotary driving pedestal, brake valve stem, rotating axle, base and ceramic valve set. A protruding portion is formed onto one end of the rotating axle and protruded outside of the flanged tube of the rotary driving pedestal. An elastomeric snapping clip is assembled between the reducing circular frame of the valve casing and the flanged tube. A snapping flange is formed from the snapping clip, such that elastic clamping effect is generated when the protruding portion is mated with the snapping flange under the action of the rotary driving pedestal. An elastic locator is set correspondingly to the snapping clip such that the snapping clip can be assembled in a limited state. Minimized components are required to form the ceramic valve core, thus lowering the cost, improving the control and extending service life.

4 Claims, 6 Drawing Sheets

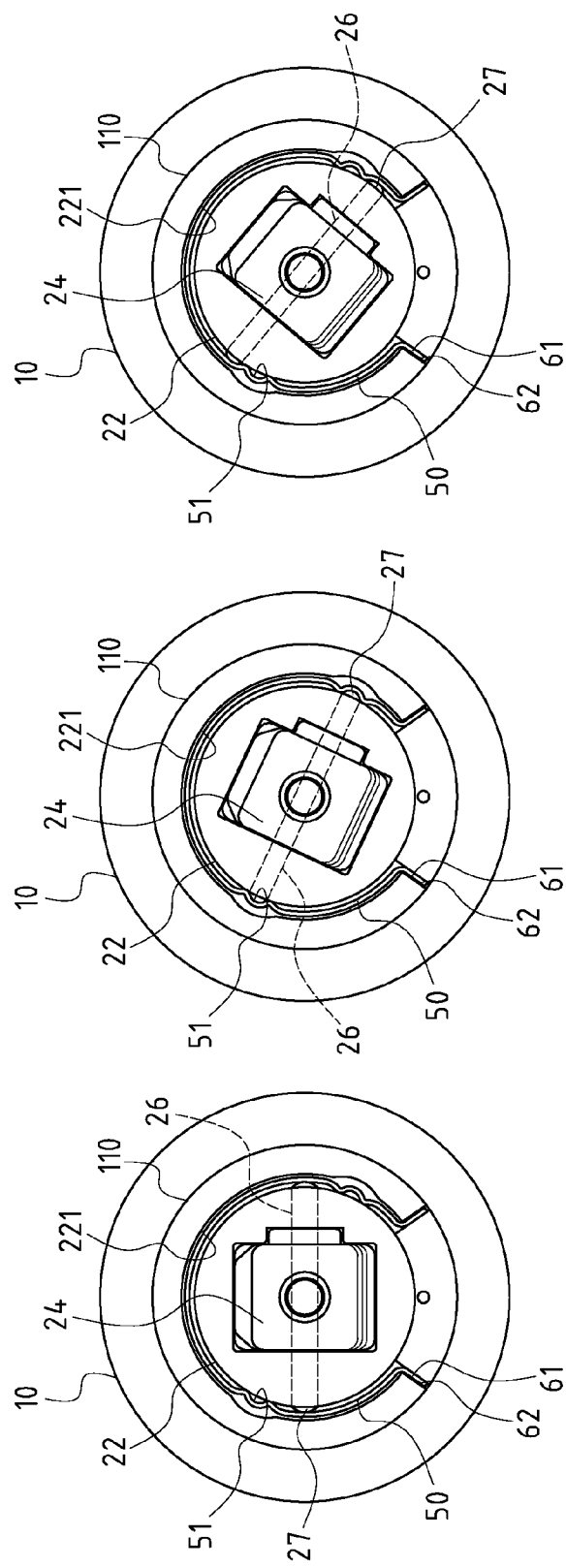

CERAMIC VALVE CORE WITH COLD/HOT SEPARATION POINT SNAPPING FUNCTIONS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a ceramic valve core, and more particularly to an innovative one which is configured with snapping identification functions for the cold/hot separation point.

2. Description of Related Art Including Information Disclosed Under 37 CFR 1.97 and 37 CFR 1.98.

As a dual temperature ceramic valve core has an extremely short rotation stroke from coldest to hottest water flow mode with an included angle less than 180°, the users may find it easy to switch to the hottest water supply state in case of careless touch, leading possibly to personal scalding. Hence, the poor safety performance of this dual temperature ceramic valve core and its hydrants raises great concern.

For these problems, an improved structure of ceramic valve core has been developed in a way that, when the brake valve stem is intended to switch from cold water to hot water mode, a damping action is triggered to generate a damping point. In such a case, if a user intends to switch the hydrant from cold water to hot water mode, a bigger pulling force must be applied to overpass the damping point, thereby avoiding possible scalding and improving the safety performance of the dual temperature hydrant.

Thus, to overcome the aforementioned problems of the prior art, it would be an advancement if the art to provide an improved structure that can significantly improve the efficacy.

Therefore, the inventor has provided the present invention of practicability after deliberate experimentation and evaluation based on years of experience in the production, development and design of related products.

BRIEF SUMMARY OF THE INVENTION

The enhanced efficacy of the present invention is as follows.

First, as the snapping clip with snapping flange is assembled between the reducing circular frame of the valve casing and the flanged tube of the rotary driving pedestal, and the protruding portion formed onto one end of the rotating axle is mated with the snapping flange, minimized components are required to form the ceramic valve core with snapping identification functions for the cold/hot separation point, thus realizing better applicability and economic benefits with lower material and assembly cost.

Second, as the snapping clip is made of an elastomeric metal, robust snapping function could be implemented while improving the manual operation feeling and extending the service life.

Third, the snapping clip with snapping flange is assembled between the reducing circular frame of the valve casing and the flanged tube of the rotary driving pedestal, and the snapping identification function for cold/hot separation point could be realized in collaboration with the rotating axle's protruding portion, so the snapping clip could be designed with respect to its characteristic or appearance variation to meet the requirements for the snapping point and control feeling of the ceramic valve core; this allows the combination of existing valve core and minimized components to implement the snapping identification functions for the cold/hot separation point, thus answering diversified demands in this industry.

BRIEF DESCRIPTION OF THE SEVERAL VIEWS OF THE DRAWINGS

FIG. 6 is a schematic mating variation chart 1 of the snapping clip and the protruding portion of the present invention.

FIG. 7 is a schematic mating variation chart 2 of the snapping clip and the protruding portion of the present invention.

FIG. 8 is a schematic mating variation chart 3 of the snapping clip and the protruding portion of the present invention.

DETAILED DESCRIPTION OF THE INVENTION

Figure 1:
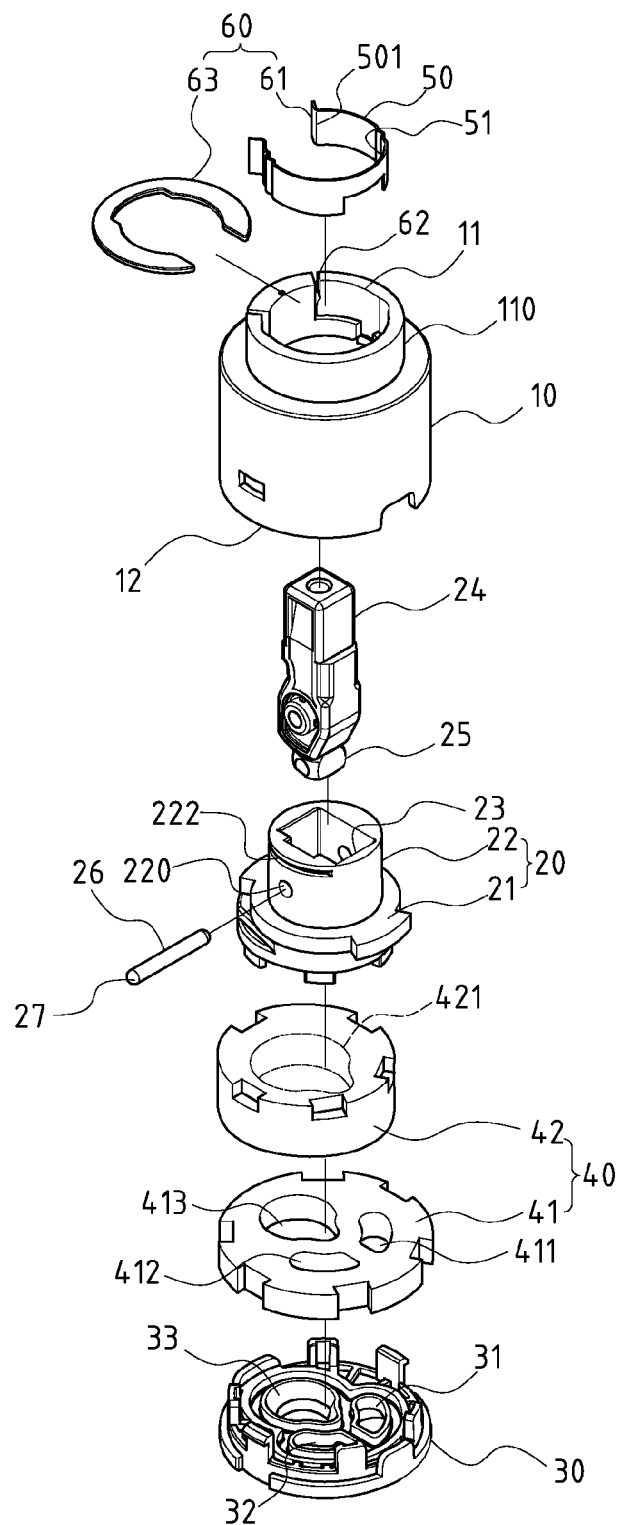
FIG. 1 is an exploded perspective view of the preferred embodiment of the present invention.
Figure 2:
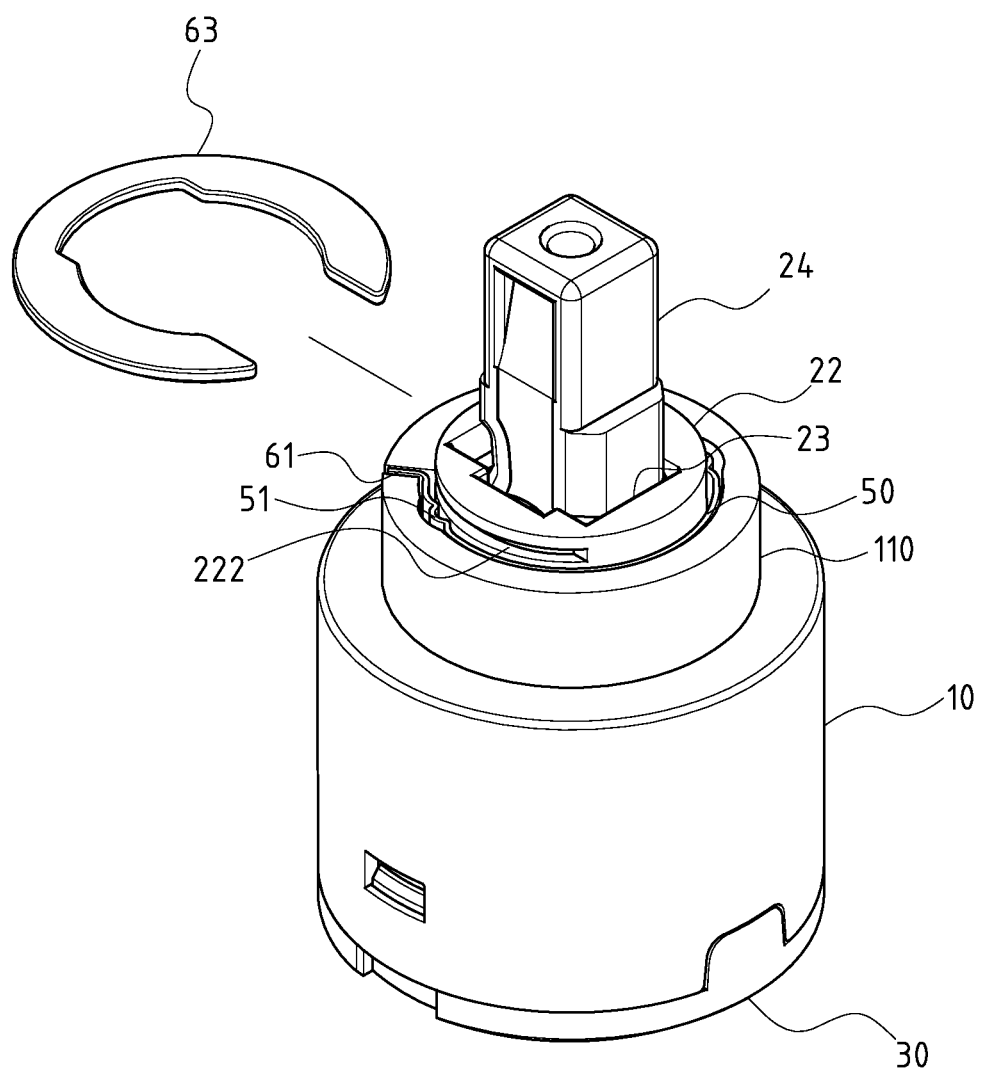
FIG. 2 is a partially assembled perspective view of the preferred embodiment of the present invention.
Figure 3:
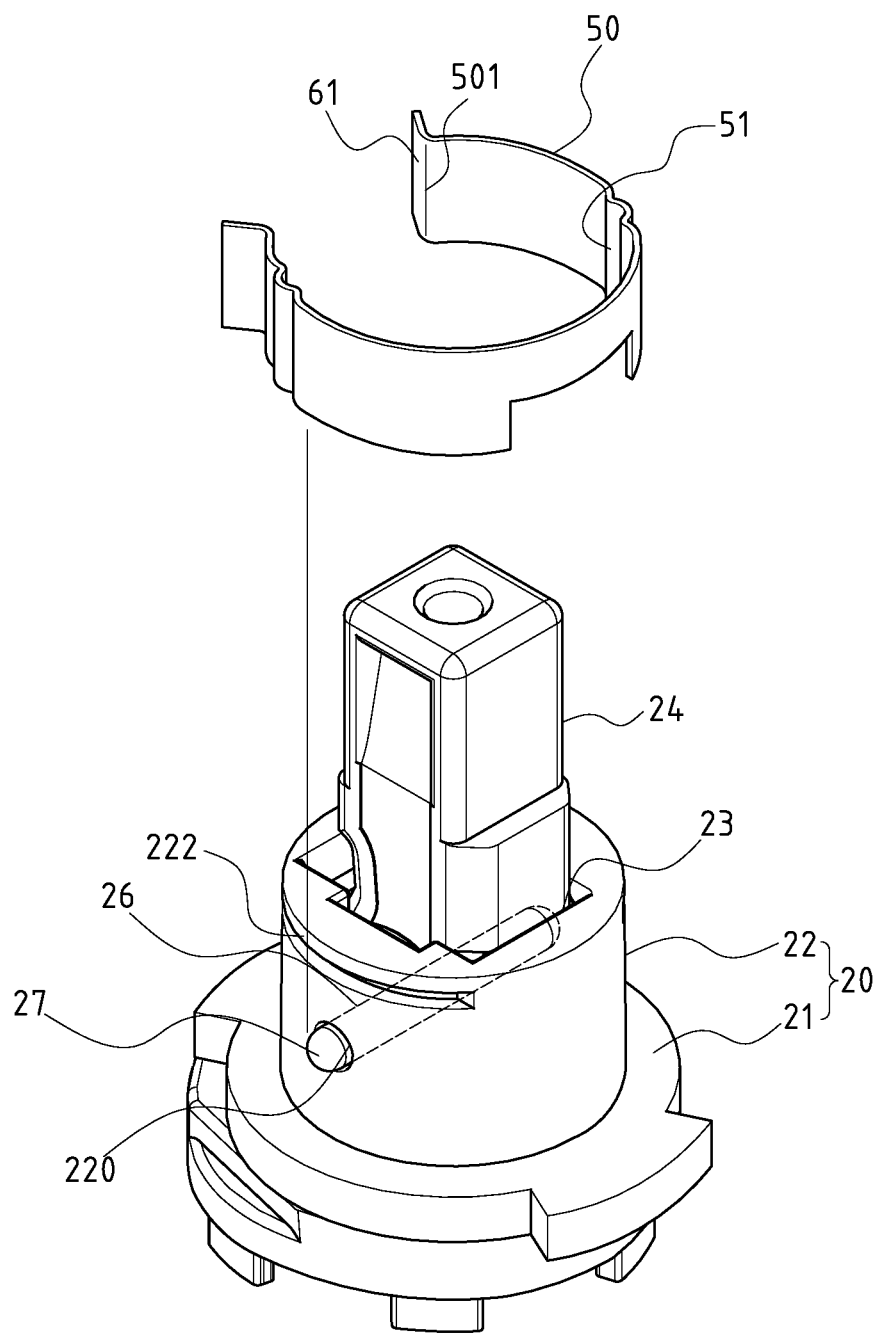
FIG. 3 is a perspective view of the present invention showing the assembly relation of the rotary driving pedestal and the snapping clip.
Figure 4:
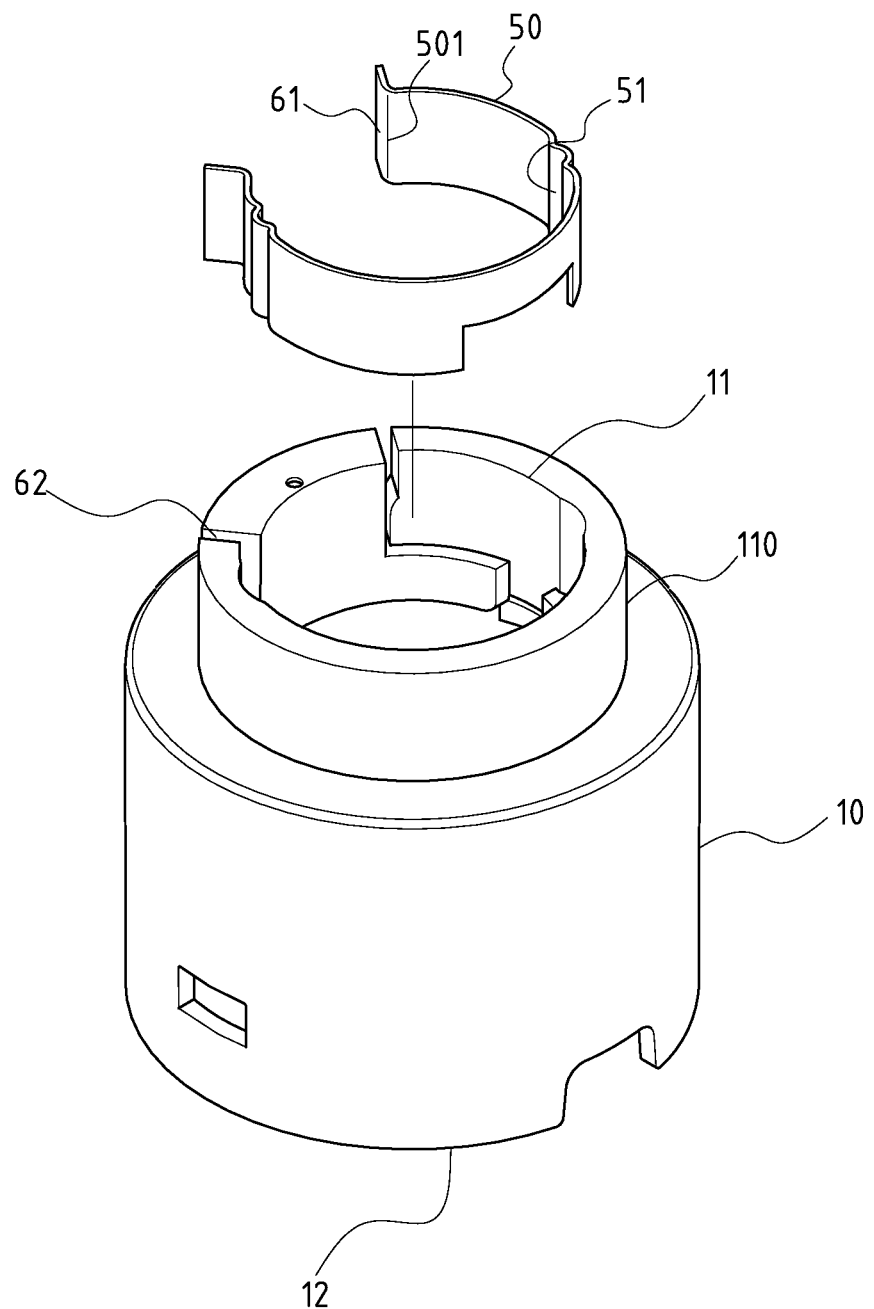
FIG. 4 is a perspective view of the present invention showing the assembly relation of the valve casing and the snapping clip.
Figure 5:
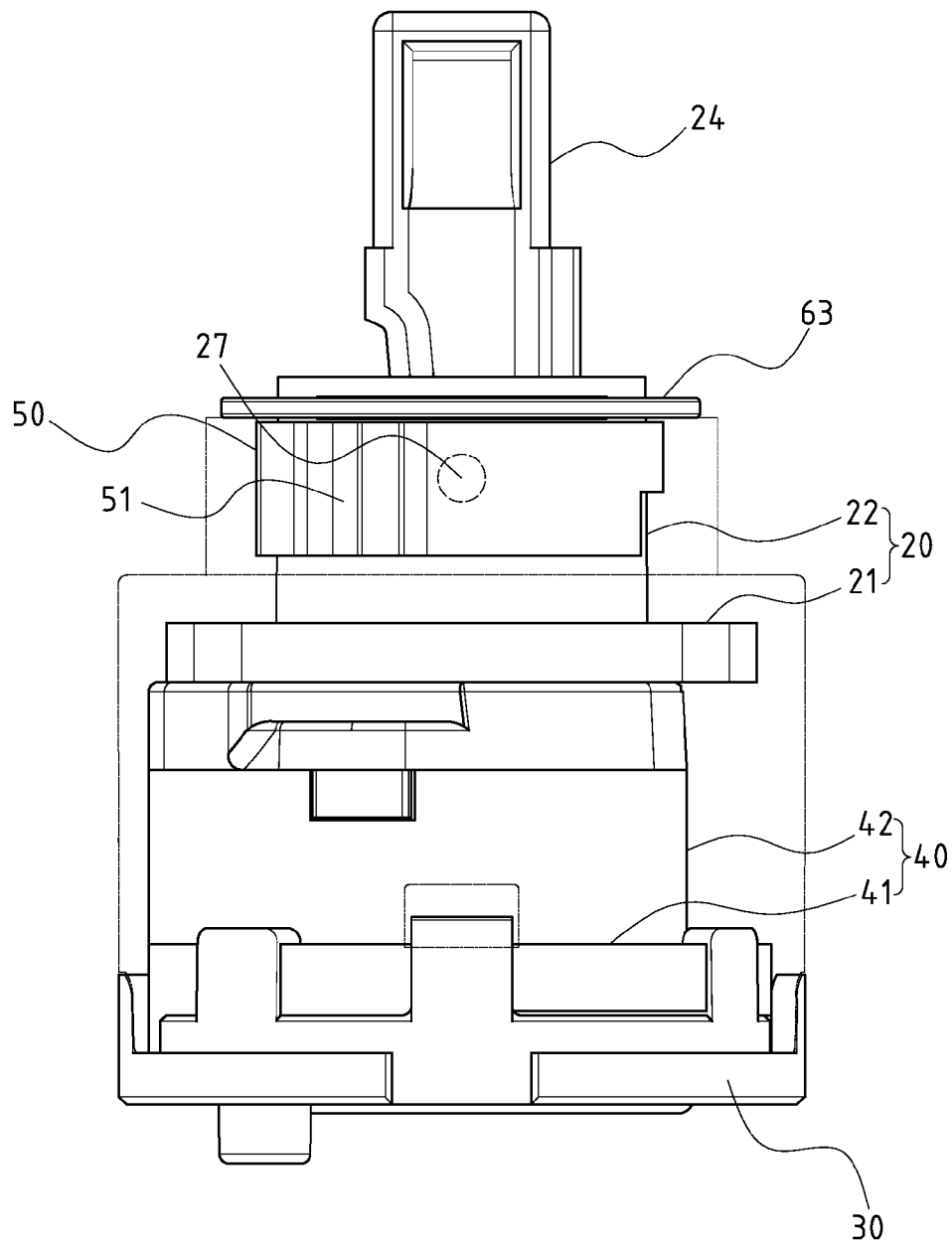
FIG. 5 is a sectional plane view of the preferred embodiment of the present invention.

Referring to FIGS. 1, 2, 3, 4, the ceramic valve core comprises a valve casing 10 in a hollow cylindrical state, having a top opening 11 and a bottom opening 12, of which the top opening 11 is provided with a reducing circular frame 110.

A rotary driving pedestal 20, having an internal pedestal 21 and a reducing flanged tube 22, of which the internal pedestal 21 is set at one end of the valve casing 10 adjacent to the top opening 11, and the flanged tube 22 is pivoted through the reducing circular frame 110 of the valve casing 10. Moreover, a valve stem retaining hole 23 is set at center of the rotary driving pedestal 20, and the flanged tube 22 is provided with a radial axle hole 220.

A brake valve stem 24 is pivoted rotarily into the valve stem retaining hole 23 of the rotary driving pedestal 20. The inner end of the brake valve stem 24 is assembled with a coupling seat 25, and the outer end of the brake valve stem 24 is protruded from the flanged tube 22 of the rotary driving pedestal 20.

A rotating axle 26, made of metal or plastics, is pivoted into the axle hole 220 on the flanged tube 22 of the rotary driving pedestal 20 and the brake valve stem 24, and taken as the swinging support of the brake valve stem 24.

A base 30 is located onto the bottom opening 12 of the valve casing 10. The base 30 has a cold water inlet 31, a hot water inlet 32 and a water outlet 33.

A ceramic valve set 40, assembled within the valve casing 10, has a fixed valve 41 and a rotary valve 42. Of which, the fixed valve 41 is assembled onto the inner face of the base 30, having a cold water through-hole 411, a hot water through-hole 412 and a discharge outlet 413. The rotary valve 42 is superimposed onto inner face of the fixed valve 41, and driven by the coupling seat 25 set at inner end of the brake valve stem 24. The rotary valve 42 has a water control groove 421 that is located correspondingly to the cold water through-hole 411, hot water through-hole 412 and discharge outlet 413 of the fixed valve 41.

A protruding portion 27 is formed directly onto one end of the rotating axle 26 in an arched or tapered shape, and protruded outside of the flanged tube 22 of the rotary driving pedestal 20.

A snapping clip 50, made of elastomeric metal or plastics, is assembled between the reducing circular frame 110 of the valve casing 10 and the flanged tube 22 of the rotary driving pedestal 20. A snapping flange 51 is formed from the snapping clip 50, such that elastic clamping effect could be generated when the protruding portion 27 of the rotating axle 26 is mated with the snapping flange 51 under the action of the rotary driving pedestal 20.

An elastic locator 60 is set correspondingly to the snapping clip 50, such that the snapping clip 50 can be assembled in a limited state.

Of which, the protruding portion 27 is formed at two ends of the rotating axle 26, such that two snapping flanges 51 are formed onto the snapping clip 50.

Of which, the snapping clip 50 is bent to form the snapping flange 51. Moreover, a recessed flange 221 (marked in FIGS. 6, 7, 8) is formed onto inner side of the flanged tube 22 of the rotary driving pedestal 20, so as to provide a recessed space for the snapping flange 51.

Of which, the snapping clip 50 is configured into a "C" shape to form two ends 501. The elastic locator 60 has two folding flanges 61, two embedding slots 62 and a buckle 63, of which two folding flanges 61 are folded outwards to be formed onto two ends 501 of the snapping clip 50, and two embedding slots 62 are set onto the reducing circular frame 110 of the valve casing 10 for embedding of two folding flanges 61. A buckling flange 222 is formed externally onto the flanged tube 22 of the rotary driving pedestal 20, so as to locate securely the buckle 63 onto it.

The cold water inlet 31 and hot water inlet 32 of the ceramic valve core of the present invention is connected separately with cold and hot water inlet tube. The operating principle of the ceramic valve core lies in that, when the brake valve stem 24 is rotated for switching, the rotary valve 42 is driven by the coupling seat 25 of the brake valve stem 24. For instance, when the hot water mode of the ceramic valve core is started, the rotary valve 42 closes the cold water through-hole 411, such that the source from how water inlet tube flows through the hot water through-hole 412 via hot water inlet 32, and then flows out of the water outlet 33 through the discharge outlet 413 of the fixed valve 41. As the same case in the cold water mode of the ceramic valve core of the present invention, the rotary valve 42 closes hot water through-hole 412, such that the source from cold water inlet tube flows through the cold water through-hole 411 via cold water inlet 31.

The core principle of the ceramic valve core of the present invention lies in that, a snapping clip 50 with snapping flange 51 is assembled between the reducing circular frame 110 of the valve casing 10 and the flanged tube 22 of the rotary driving pedestal 20. And, a protruding portion 27 formed onto one end of the rotating axle 26 is mated with the snapping flange 51. Referring to FIGS. 6-8, mating variation charts of the protruding portion 27 and snapping flange 51 under cold/hot water modes are shown. When cold water is switched to hot water, the protruding portion 27 of the rotating axle 26 is mated with the snapping flange to yield an elastic snapping effect under reverse action of the rotary driving pedestal 20, such that the ceramic valve core has the snapping identification functions for the cold/hot separation point.

I claim:

1. An improved ceramic valve core with snapping functions for the cold/hot separation point comprising:

a valve casing in a hollow cylindrical state, having a top opening and a bottom opening, of which the top opening is provided with a reducing circular frame;

a rotary driving pedestal having an internal pedestal and a reducing flanged tube, of which the internal pedestal is set at one end of the valve casing adjacent to the top opening, and the flanged tube is pivoted through the reducing circular frame of the valve casing;

moreover, a valve stem retaining hole is set at center of the rotary driving pedestal, and the flanged tube is provided with a radial axle hole;

a brake valve stem, pivoted rotarily into the valve stem retaining hole of the rotary driving pedestal; the inner end of the brake valve stem is assembled with a coupling seat, and the outer end of the brake valve stem is protruded from the flanged tube of the rotary driving pedestal;

a rotating axle, pivoted into the axle hole on the flanged tube of the rotary driving pedestal and the brake valve stem, and taken as the swinging support of the brake valve stem;

a base, located onto the bottom opening of the valve casing; the base having a cold water inlet, a hot water inlet and a water outlet;

a ceramic valve set, assembled within the valve casing, having a fixed valve and a rotary valve; of which the fixed valve is assembled onto the inner face of the base having a cold water through-hole, a hot water through-hole and a discharge outlet; the rotary valve is superimposed onto inner face of the fixed valve, and driven by the coupling seat set at inner end of the brake valve stem; the rotary valve having a water control groove that's located correspondingly to the cold water through-hole, hot water through-hole and discharge outlet of the fixed valve;

a protruding portion, formed directly onto one end of the rotating axle in an arched or tapered shape, and protruded outside of the flanged tube of the rotary driving pedestal;

a snapping clip, made of elastomeric strip, assembled between the reducing circular frame of the valve casing and the flanged tube of the rotary driving pedestal; a snapping flange is formed from the snapping clip, such that elastic clamping effect could be generated when the protruding portion of the rotating axle is mated with the snapping flange under the action of the rotary driving pedestal; and an elastic locator, set correspondingly to the snapping clip, such that the snapping clip can be assembled in a limited state.

2. The improved structure defined in claim 1, wherein said protruding portion is formed at two ends of the rotating axle, such that two snapping flanges are formed onto the snapping clip.

3. The improved structure defined in claim 1, wherein said snapping clip is bent to form the snapping flange; moreover, a recessed flange is formed onto inner side of the flanged tube of the rotary driving pedestal, so as to provide a recessed space for the snapping flange.

4. The improved structure defined in claim 1, wherein said snapping clip is configured into a "C" shape to form two ends; the elastic locator having two folding flanges, two embedding slots and a buckle, of which two folding flanges are folded outwards to be formed onto two ends of the snapping clip, and two embedding slots are set onto the reducing circular frame of the valve casing for embedding of two folding flanges; a buckling flange is formed externally onto the flanged tube of the rotary driving pedestal, so as to locate securely the buckle onto it.

* * * * *